United States Patent [19]

Gordon et al.

[11] 4,155,697
[45] May 22, 1979

[54] CONTAINER FOR STORING FOOD AND PROCESS AND APPARATUS FOR MAKING THAT CONTAINER

[75] Inventors: Robert L. Gordon, Monroe; George H. Naugle, Central Valley, both of N.Y.; Keith A. Cooper, Laurel, Md.

[73] Assignee: International Paper Company, New York, N.Y.

[21] Appl. No.: 745,834

[22] Filed: Nov. 29, 1976

[51] Int. Cl.² .............................................. B29C 17/00
[52] U.S. Cl. .................................. 425/535; 425/387.1
[58] Field of Search ............... 425/535, 112, 523, 527, 425/342.1, 388, 110, 387.1, 534, 528, 389, 397, 530, 529

[56] References Cited

U.S. PATENT DOCUMENTS

| | | | |
|---|---|---|---|
| 2,891,280 | 6/1959 | Politis | 425/387.1 X |
| 2,962,768 | 12/1960 | Politis | 425/389 X |
| 3,081,491 | 3/1963 | Black | 425/387.1 X |
| 3,366,019 | 1/1968 | McGee | 425/110 X |
| 3,390,618 | 7/1968 | McArdle | 425/388 X |
| 3,555,652 | 1/1971 | Ignell | 425/397 |
| 3,770,860 | 11/1973 | Amberg et al. | 425/535 X |
| 3,882,212 | 5/1975 | Edwards | 425/534 X |
| 3,949,046 | 4/1976 | Procter | 425/528 X |
| 3,955,266 | 5/1976 | Honami et al. | 425/388 X |
| 3,995,763 | 12/1976 | Ayres et al. | 425/388 X |
| 4,025,275 | 5/1977 | Gournelle | 425/387.1 |

FOREIGN PATENT DOCUMENTS

4629993  8/1971  Japan ......................................... 425/541

*Primary Examiner*—William R. Briggs
*Attorney, Agent, or Firm*—Richard M. Barnes

[57] ABSTRACT

Disclosed is a container for storing product, a process and apparatus for making that container, a process and apparatus for drawing and blow forming plastic into a paperboard outer container and a process and apparatus for heat sealing a container. The container comprises a paperboard outer container and a plastic inner container which has been drawn and blow formed into the outer container. At the mouth of the container are horizontal plastic flanges which extend about the periphery of the container at least about ⅛ inch outwardly from the plastic inner container. Vertical flanges extend downwardly at least about ⅛ inch from the horizontal flanges. After product is placed in the container, the container is sealed by a heat sealable cover. A plastic overcap may be provided which engagedly fits around the container at its top.

4 Claims, 8 Drawing Figures

CONTAINER FOR STORING FOOD AND PROCESS AND APPARATUS FOR MAKING THAT CONTAINER

BACKGROUND OF THE INVENTION

Containers for storing food are well known in the art. It is well known that such containers may be produced from many different materials and combinations of materials, e.g., paperboard, glass, aluminum and certain plastics. There are, of course, advantages and disadvantages which inhere in the use of each of those different materials. For example, paperboard is a relatively strong container material but suffers from the disadvantage that it is relatively permeable to gases and, therefore, foods stored in containers constructed solely from paperboard lose their freshness at a relatively rapid rate. On the other hand, glass, aluminum and some plastic materials are relatively impermeable to gases, but to obtain sturdy containers from those materials is expensive because of the relatively high cost of those materials.

It is therefore most desirable in the food container art to provide a container which is sturdy, relatively impermeable to gases and relatively inexpensive. The containers of the present invention satisfy each of those three criteria.

The present invention is also directed to a process and apparatus for making that sturdy, relatively impermeable and inexpensive container.

SUMMARY OF THE INVENTION

The container of the present invention comprises a paperboard outer container and a plastic inner container which has been drawn and blow formed into the paperboard outer container. The outer container comprises at least one vertical wall. Preferably, the outer container has four vertical walls and a bottom and is coated with polyethylene.

The drawn and blow formed plastic inner container with one exception conforms in shape and abuts with the outer container. That one exception is at the inside bottom edge or edges of the outer container defined by the intersection of the vertical wall or walls of the outer container and the bottom of the outer container. At those edges of the outer container, the plastic inner container is rounded and spaced about ⅛ inch to about ⅜ inch from the inside bottom edge or edges of the outer container.

The strength of the containers of the present invention is substantially enhanced by spacing the plastic inner container from the inside bottom edge or edges of the paperboard outer container in the above-described manner. This advantage is particularly important when the containers are used to store relatively large volumes, e.g. 1 gallon or more, of relatively dense food, e.g. mustard or catsup. We have discovered that if the drawn and blow formed plastic substantially abuts the inside bottom edge or edges of the paperboard outer container, then that abutting plastic ruptures substantially more readily than if the plastic is spaced from the inside bottom edge or edges.

At the mouth of the container is at least one horizontal plastic flange which extends about the periphery of the mouth of the container at least about ⅛ inch outwardly from the plastic inner container. At least one vertical flange extends downwardly at least about ⅛ inch from the at least one horizontal flange. Those flanges must extend outwardly and downwardly at least about ⅛ inch to give the container adequate strength and to insure an adequate heat seal between a later described heat sealable cover and the horizontal flange.

The heat sealable cover referred to above may be precut and scored so that the cover is heat sealed to substantially the entire surface area of the horizontal flanges. Additionally, we prefer to provide the heat sealable cover with at least one vertical pull tab which extends parallel to the at least one vertical flange. That at least one vertical pull tab protects the heat seal from rupture during storage and provides means for manually breaking the heat seal when it is so desired. Alternatively, the heat sealable cover may be cut concurrently with the heat sealing operation, again so that substantially the entire surface area of the horizontal flange is heat sealed. The heat sealable cover is constructed from at least paperboard, preferably cartonboard, and sealing material, e.g. wax or heat sealable polymer. Preferably, aluminum foil is also employed in the heat sealable cover to provide a cover which is highly impermeable to air and water. The most preferred heat sealable cover comprises a laminate of aluminum foil sandwiched between cartonboard and sealing material. The aluminum foil is attached to the cartonboard by any suitable adhesive. The cartonboard is preferably at least about 12 point board to give the heat sealable cover adequate strength and rigidity.

The container of the present invention may be provided with an overcap which engagedly fits around the container at its top. Preferably, the overcap is constructed from styrene.

The containers of the present invention are constructed by positioning a paperboard outer container having at least one vertical wall into a female mold. Thereafter, a heated sheet of plastic is drawn into a female mold with a male mandrel. The male mandrel is provided with holes in communication with a gas supply so that after the plastic is drawn into the mold, the plastic may be blow formed into substantial abutment with the inside vertical wall or walls of the paperboard outer container. As discussed above, the paperboard outer container may or may not have a bottom. In the event that the outer container has a bottom, then the plastic is blow formed so that the plastic is spaced from the bottom edge or edges of the outer container in the above described manner.

As indicated above, the paperboard outer container of the present invention has at least one vertical wall. When the outer container has one vertical wall, preferably a cross-section of that wall along a horizontal plane is circular in configuration. When the outer container has more than one vertical wall, those vertical walls, of course, intersect one another to form vertical edges.

We have discovered that in order to adequately blow form plastic into paperboard outer containers having more than one vertical wall requires a specially designed male mandrel. First, each vertical edge of the container formed by the intersection of two vertical walls must have gas directed substantially into it. This is accomplished by providing the mandrel with rows of substantially aligned air holes directed substantially into each edge formed by the intersection of two vertical walls. We have discovered that even distribution of plastic during blow molding is obtained if the male mandrel has rows of substantially aligned air holes directed as described above.

We have also discovered that a conical mandrel must be employed to obtain adequate plastic distribution when the paperboard outer container has more than one vertical wall. The reason for this is that when a mandrel with vertical sidewalls is employed, plastic tends to web or gather at the top edges of the container at the intersection of two vertical walls. This "webbing" or "gathering" impedes the formation of an adequate heat seal between the heat sealable cover and the at least one horizontal flange of the container, and is therefore to be avoided.

As indicated above, the paperboard outer container of the present invention preferably has a bottom. When the paperboard outer container has a bottom, that container, of course, has a bottom edge or edges formed by the intersection of the bottom and the vertical wall or walls of the paperboard outer container. We have discovered that even distribution of plastic is obtained during blow forming if the male mandrel has a row of substantially horizontally aligned holes directed substantially at the bottom edge or edges formed by the intersection of the bottom and vertical wall or walls of the paperboard outer container.

Prior to drawing, the plastic sheet is heated by any suitable means to a drawable state. The male mandrel and female mold are designed and arranged so that the horizontal and vertical flanges discussed above are formed during the end of the drawing operation. Preferably, initially the paperboard outer container extends about 1/16 inch above the female mold. This permits the plastic to be compacted and bonded onto the board during the drawing operation so as to obtain a lock between the plastic and paperboard outer container.

After the plastic has been drawn and blow formed as described above, food is placed into the container by any suitable means. Thereafter, the container is sealed with a heat sealable cover. The container is heat sealed by placing a layer of heat sealable cover material between a heated platten and a female mold with the container positioned therein. The heat sealable cover is then heat sealed to the at least one horizontal flange by pressure and heat applied by a heated platten.

The heated platten of the present invention may be heated by any suitable means to a temperature sufficient to heat seal the cover to the at least one horizontal flange in the above described manner. For an adequate heat seal to be obtained, we have found that air must be evacuated from the inside of the container prior to contact of the heat sealable cover material to the at least one horizontal flange. The preferred means for accomplishing this objective is to provide the heated platten with an air displacement block. That air displacement block projects from the heated platten so that the heat sealable cover material is pushed into the interior of the container, thereby evacuating air therefrom, before the heat sealable cover material is pressed by the heated platten onto the at least one horizontal flange.

After the heat sealable cover has been heat sealed to the at least one horizontal flange of the container, the container may be provided with an overcap which engagedly fits around the container at its top.

DESCRIPTION OF THE PREFERRED EMBODIMENTS

Figure 1:
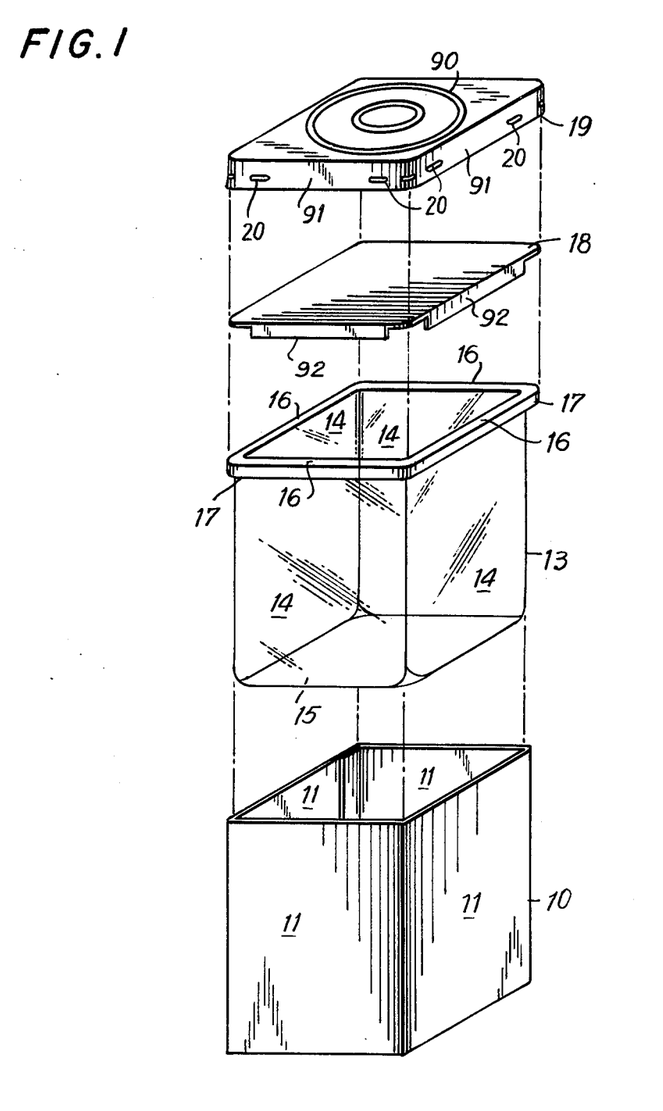
FIG. 1 shows an exploded view of a container of the present invention.

Referring to FIG. 1, there is shown an exploded view of a container of the present invention. The container comprises a paperboard outer container 10. That outer container is preferably constructed from folded polyethylene coated paperboard and comprises four vertical walls 11. As shown in FIGS. 2-5, the outer container preferably also comprises a bottom 12.

The container of the present invention also comprises a plastic inner container 13 which, as is described more fully below, has been drawn and blow formed into the paperboard outer container 10. The plastic inner container 13 comprises four vertical walls 14 and bottom wall 15. Four horizontal flanges 16 extend from the plastic inner container about the periphery of the mouth of the container. Four vertical flanges 17 in turn extend from the four horizontal flanges 16. The horizontal and vertical flanges 16 and 17 extend at least about ⅛ inch from the inner container 13 and horizontal flanges 16, respectively. We have discovered that both the horizontal and vertical flanges must be dimensioned as described above in order for the containers of the present invention to have adequate strength.

It will be observed upon reference to FIG. 1 that the plastic inner container is rounded at the points where vertical walls 14 intersect bottom 15. The reason for this is that the strength of the containers of the present invention is substantially enhanced by spacing the plastic inner container from the edges of the paperboard outer container formed by the intersection of vertical walls 11 and bottom 12. Specifically, to enhance the strength of the containers of the present invention, the plastic inner container should be spaced from about ⅛ inch to about ⅜ inch and preferably ¼ inch from the edges formed by the intersection of vertical walls 11 and bottom 12.

We have discovered that when the plastic inner container closely abuts the edges formed by the intersection of vertical walls 11 and bottom 12, then the plastic in those edges ruptures substantially more readily then when the plastic is spaced from those edges in the above described manner. This advantage of the present invention is particularly important when the containers of the present invention are used to store 1 gallon or more of readily dense food, e.g. mustard or catsup.

While we do not wish to be bound to any particular theory, we believe that the superior strength of containers with a plastic inner container which is spaced from the bottom edges of a paperboard outer container may be due to two factors. First, we have discovered that plastic which is blow formed into close abutment with those bottom edges is thinner than plastic which is blow formed to be spaced from the bottom edges in the above described manner. This thinning out of the plastic is particularly apparent at the 90° bottom corners defined by the intersection of two side walls and the bottom of the outer container. For this reason we believe it is particularly critical that the plastic inner container be spaced from the outer container at the 90° bottom corners. Secondly, we believe that the air space between the plastic inner container and bottom edges of the outer container serves as a cushion to help absorb shocks which occur when the containers are shipped and handled.

The plastic which is used to form the plastic inner container and flanges of the present invention may be chosen from a plurality of different materials. Of course, the plastic used must be a thermoplastic material which is capable of being drawn and blow formed into the inner container. Another important factor in determining the plastic which should be used for the inner container is the food which is to be stored in the container. The reason for this is that some foods are more susceptible to alteration upon exposure to oxygen or moisture and therefore desirably are stored in containers constructed from high barrier plastics. Examples of high barrier plastics which may be used in the present invention are Barex, a styrene acrylonitrile copolymer, and Cycopac, and acrylonitrile-butadiene-styrene terpolymer.

There are, of course, many other plastics which may be used to form the plastic inner container, including medium barrier plastics, e.g. butadiene-styrene copolymer, and low barrier plastics, e.g. polyethylene or styrene, as well as the high barrier plastics referred to above.

Additionally, the plastic inner container of the present invention may be formed of a composite of two or more plastic materials which are joined together, preferably in the absence of adhesive, e.g. Barophane, manufactured by National Can Corporation. For example, the inner container may be constructed from a composite of a layer of high density polyethylene joined in the absence of adhesive to a layer of Barex or Cycopac. We prefer that the composite is drawn and blow formed into the container so that the polyethylene layer faces the interior of the container because heat sealable cover 18 is generally more readily heat sealed onto polyethylene than onto Barex or Cycopac.

As shown in FIG. 1, heat sealable cover 18 is precut and scored so that the cover 18 is heat sealed to substantially the entire surface area of horizontal flanges 16. Additionally, as shown in FIG. 1, the heat sealable cover is provided with vertical pull tabs 92 which extend parallel to vertical flanges 17. Vertical pull tabs 92 protect the heat seal from rupture during storage and provide means for manually breaking the heat seal when it is so desired. Preferably vertical pull tabs 92 cover at least 80% of the surface area of vertical flanges 17 but it should be understood that vertical pull tabs 92 are not an essential element of the present invention.

Figure 7:
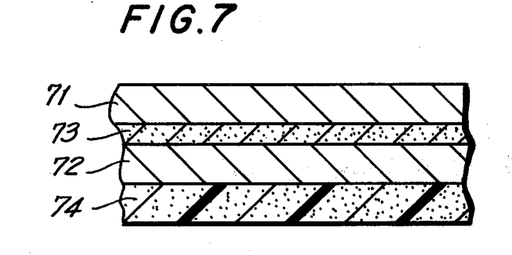
FIG. 7 shows an enlarged cross-sectional view of a heat sealable cover which may be used in the present invention.

Referring now to FIG. 7, there is shown a cross-sectional view of the most preferred heat sealable cover which may be used in the present invention. As shown, heat sealable cover comprises a layer of paperboard, preferably cartonboard 71, which is attached to a layer of aluminum foil 72 by a layer of glue 73. A layer of sealing material 74 is attached by its own substance to the layer of aluminum foil 72.

Figure 8:
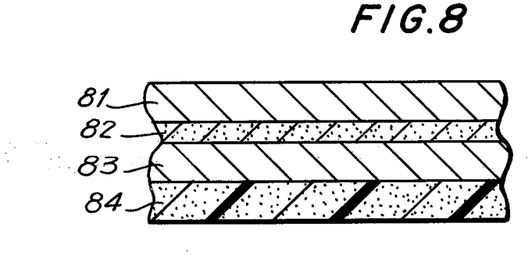
FIG. 8 shows an enlarged cross-sectional view of another heat sealable cover which may be used according to the present invention.

Referring now to FIG. 8 there is shown, in cross-section, an alternative construction for heat sealable cover of the present invention. In the construction shown in FIG. 8, a layer of aluminum foil 81 is attached by a layer of glue 82 to a layer of cartonboard 83. A layer of sealing material 84 is attached by its own substance to the layer of cartonboard 83.

In both embodiments shown in FIGS. 7 and 8, the layer of aluminum foil is present for its barrier properties, i.e., the layer of aluminum foils retards the flow of gases and moisture through the heat sealable cover. It should be understood that the layer of aluminum foil and the layer of glue which is required to attach that foil to the cartonboard may be eliminated in the event that high barrier properties are not required for the food which is to be stored in the container.

The cartonboard in the heat sealable cover gives that cover rigidity and strength. That cartonboard should preferably be at least about 12 point cartonboard in order to provide the heat seal with enough support so that the seal will not be broken too easily during storage and transport of the container.

The sealing material in the heat sealable cover may be any wax, hot melt adhesive, or polymer material which can be heat sealed to the plastic flange and stripped therefrom without destroying that flange. For example, polyvinylacetate-polyethylene or vinylacetate-ethylene-acrylate polymers may be used as sealing material. The most preferred sealing material is a material manufactured by Gravure Flex Corporation, South Hackensack, New Jersey under the Code name F 827 T.

Again referring to FIG. 1, preferably the container of the present invention also comprises overcap 19. That overcap is designed so that it engagedly fits around the container at its top. As shown in FIG. 1, overcap 19 desirably has locking lugs 20 which are arranged on the overcap so that the overcap engagedly interlocks with vertical flanges 17. Additionally, the side walls 91 of overcap 19 are preferably tapered outwardly so that the overcaps can be stacked one onto the other. Finally, overcap 19 is preferably provided with recessed antiwarp circles 90. It is to be understood, however, that the locking lugs, tapered sides, and antiwarp circles are not part of the present invention. In the most preferred embodiment, overcap 19 is constructed from styrene.

The primary function of overcap 19 is to serve as a cover for the container once the heat seal between the heat sealable cover 18 and horizontal flanges 16 is broken. A secondary purpose of overcap 19 is to provide protection for the heat sealable cover 18 during shipping and storage of the container.

Figure 2:
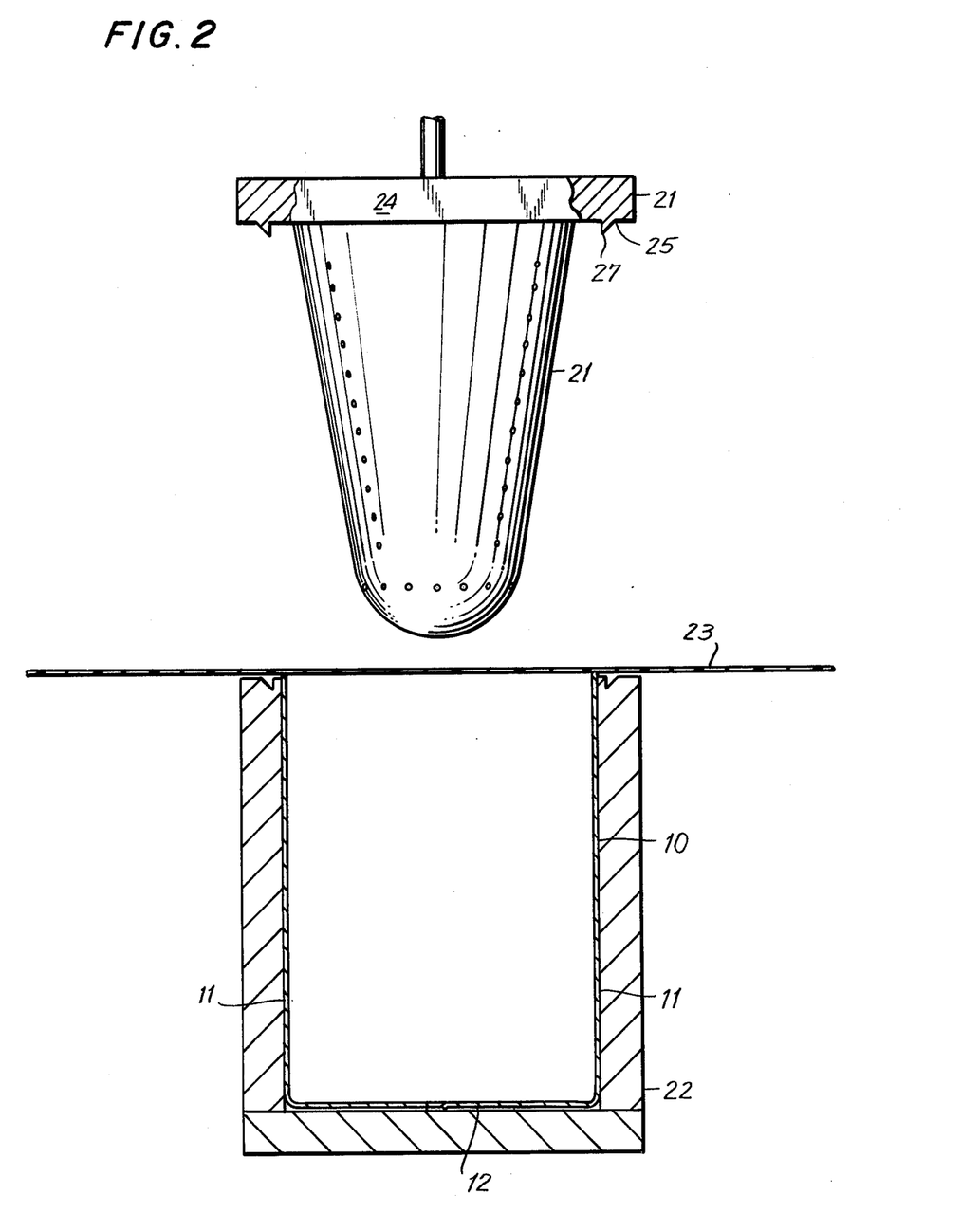
FIG. 2 shows a sectional view of the arrangement of the male mandrel, female mold, plastic sheet and paperboard outer container before the plastic sheet is drawn into the paperboard outer container.
Figure 3:
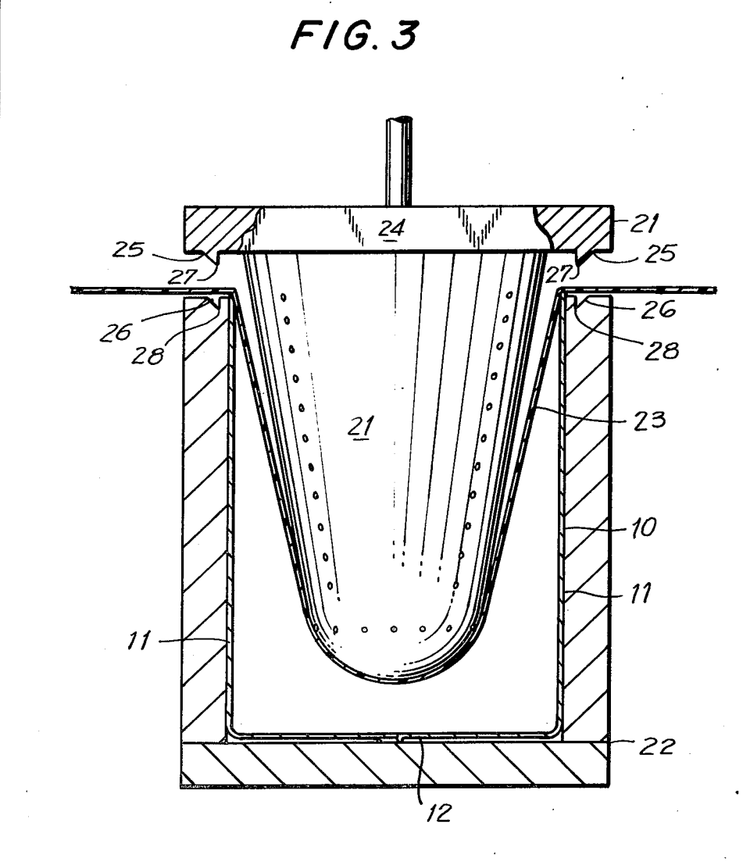
FIG. 3 shows a sectional view of the arrangement of the male mandrel, female mold, plastic sheet and paperboard outer container during the drawing of the plastic sheet into the paperboard outer container.
Figure 4:
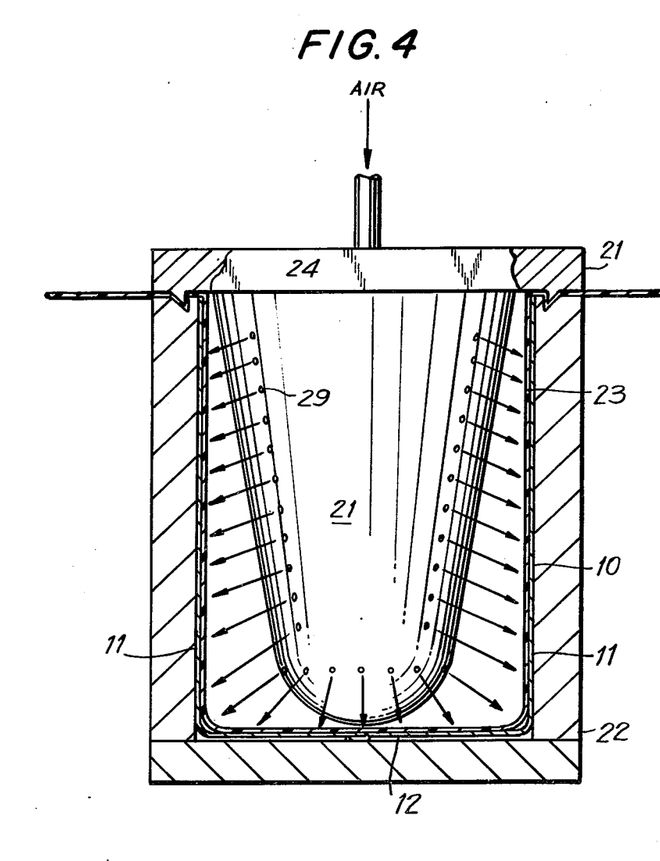
FIG. 4 shows a sectional view of the arrangement of the male mandrel, female mold, plastic sheet, and paperboard outer container while the plastic sheet is being blow formed in the female mold.

Referring now to FIGS. 2-4, there is shown stepwise the process for drawing and blow forming plastic inner container 13 into paperboard outer container 10 while simultaneously forming horizontal flanges 16 and vertical flanges 17. Specifically, referring to FIG. 2 there is shown a sectional view of the arrangement of male mandrel 21, female mold 22, plastic sheet 23 and paperboard outer container 10 prior to drawing plastic sheet 23 into paperboard outer container 10.

As shown in FIG. 2, paparboard outer container 10 is placed into female mold 22 substantially as shown. In the most preferred embodiment, vertical walls 11 of paperboard outer container 10 initially extend outwardly from the female mold 22. The reason for this is so that plastic sheet 23 is crushed into and bonded to paperboard outer carton 10 during the drawing operation. Preferably, the paperboard outer container 10 extends initially from about 1/32 inch to about 3/32 inch, and most preferably about 1/16 inch outwardly from female mold 22. We have discovered that when the paperboard outer container 10 extends more than about 3/32 inch above female mold 22, the paperboard folds or crumples excessively. On the other hand, if paperboard outer container 10 extends less than about 1/32 inch above female mold, then the desired good lock between the plastic and paperboard outer container is not obtained.

As shown in FIG. 2, plastic sheet 23 is initially positioned between male mandrel 21 and female mold 22. As shown, plastic sheet 23 is larger than required for drawing and blow forming plastic inner container 13 into the paperboard outer container 10. The reason for this, as will be more fully explained below, is that in the most preferred embodiment plastic sheet 23 is simultaneously drawn and blow formed into a plurality of paperboard outer containers 10. Additionally, horizontal and vertical flanges 16 and 17 are also simultaneously formed for a plurality of containers in the most preferred embodiment of the present invention. It is to be understood, however, that it is within the scope of the present invention to draw and blow form plastic sheet 23 into a single paperboard outer container 10.

However, when plastic is simultaneously drawn and blow formed simultaneously into a plurality of paperboard outer containers, we prefer to use a single plastic sheet 23, portions of which are drawn and blow molded into each paperboard outer container 10. As will be described more fully below, in this preferred embodiment, plastic sheet 23 is cut by the coaction of male mandrel 21 and female mold 22 so as to provide distinct plastic inner containers 13 for each paperboard outer container 10.

As is evident from FIGS. 2-4, male mandrel 21 and female mold 22 are arranged and constructed so that male mandrel 21 may engage female mold 22. Prior to positioning plastic sheet 23 as shown in FIG. 2 and described above, that plastic sheet is heated to a thermal formable temperature, i.e., a temperature sufficient to permit drawing and blow forming the plastic sheet 23 into paperboard outer container 10. Additionally, depending on the plastic used, the ambient temperature, and the temperature that the plastic was preheated to, it may be necessary to maintain the plastic at a thermal formable temperature during the drawing operation by heating mandrel 21 to an appropriate temperature by any suitable means.

The thickness of plastic sheet 23 may be varied widely depending on the size of the container, and the plastic used. For example, with Barex plastic and a one gallon container, it is preferred that plastic sheet 23 be between about 15 and 30 mils thick, the most preferably be about 20 mils thick.

Referring now to FIG. 3, there is shown in cross-section section the arrangement of male mandrel 21, female mold 22, plastic sheet 23 and paperboard outer container 10 at one stage during the drawing of the plastic sheet 23 into paperboard outer container. As is apparent from FIG. 3, as the drawing operation continues past the stage shown in FIG. 3, eventually the base 24 of male mandrel 21 contacts plastic sheet 23.

The base 24 of male mandrel 21 comprises protruding vertical flange forming means 25 which is in alignment with recessed vertical flange forming means 26 in female mold 22. Preferably, protruding vertical flange forming means 25 has a sharp protruding edge 27 which is aligned with sharp recessed edge 28 of recessed vertical flange forming means 26.

As will be appreciated upon reference to FIGS. 3 and 4, male mandrel 21 and female mold 22 are designed and arranged so that when the drawing operation is completed, protruding vertical flange forming means 25 has entered and substantially filled recessed vertical flange forming means. A necessary consequence of this is that plastic sheet 23 is cut during the drawing operation so as to provide, as discussed above, a distinct plastic inner container 13 and horizontal and vertical flanges 16 and 17.

It will also be appreciated upon reference to FIGS. 3 and 4 that male mandrel 21 and female mold 22 are designed and arranged so that the upper edge of paperboard outer container 10, which initially protruded outside female mold 22 as discussed aove, is crushed or compressed into the female mold 22 during the drawing operation so that paperboard outer container 10 no longer protrudes from female mold 22.

Referring now to FIG. 4, there is shown a sectional view of male mandrel 21, female mold 22, paperboard outer container 10, and plastic sheet 23 at one stage during the blow forming of plastic sheet 23. As shown in FIG. 4, male mandrel 21 is in communication with a source of air so that air can be directed out of air holes 29 disposed in male mandrel 21. It should be understood that while gases other than air may be employed in the blow forming step, in the preferred embodiment air is employed to blow form the plastic.

Because paperboard outer container 10 has bottom 12, there must be provided means for relieving pressure in the container which otherwise would build up in the container during the blow forming step of the present invention. To accomplish this purpose, we prefer to provide pin holes in the bottom 12 of paperboard outer container 10. For example, for a 1 gallon container with a 5½ inch square bottom, we prefer to provide six pin holes along each edge of the bottom 12 of the container. Of course, suitable means must also be provided for relieving air pressure from female mold 22.

A wide range of air pressures may be used according to the present invention. For example, the air pressure at the air intake to male mandrel may be between about 10 to 50 psig. We prefer, however, for reasons of safety and economics, to use relatively low air pressures, i.e., less than about 35 psig.

As indicated above, the preferred outer containers of the present invention have a rectangular cross-section and a bottom. Most preferably, the containers of the present invention have a square cross-section along a plane parallel to the bottom of the container. We have discovered that under the above set of conditions a specially designed male mandrel substantially enhances the blow forming process. First, the mandrel should be conical shaped. Second, the mandrel should have four rows of aligned air holes which are arranged and constructed so that air is directed from each row of holes into one of the four edges of the container defined by the intersection of two of the four vertical walls 11 of paperboard outer container. Two of those rows of substantially aligned air holes are shown in FIG. 4. Additionally, the male mandrel should have a row of generally horizontally aligned air holes. That row of generally horizontally aligned air holes is arranged and constructed so that air is directed from each hole into one of the four edges of the container defined by the intersection of container bottom 12 and one of the four vertical walls 11.

For best results each of the rows of generally aligned air holes which are directed into one of the edges defined by intersecting vertical walls should extend at least 50% of the length of the conical portion of male mandrel 21 and preferably at least about 70% of that length. Additionally, the row of generally horizontally aligned air holes should extend substantially about the entire circumference of the male mandrel 21.

We have discovered that unless a conical male mandrel is used, excessive webbing or gathering of plastic occurs at the top of the container at the four edges defined by the intersection of vertical walls 11. This may prevent the creation of an adequate heat seal between horizontal and vertical flanges 16 and 17 and heat sealable cover 18.

We have also discovered that each edge of the container defined by either two intersecting vertical side walls or an intersecting side wall and bottom wall should have a set of air holes directed substantially at that edge as described above or, otherwise, the plastic will be unevenly blow formed.

It should be understood that a specially designed mandrel may also be required when other shapes of containers are constructed according to the present invention. For example, to construct a hexagonal container with six side walls and a bottom, a conical male mandrel with six rows of generally vertically aligned air holes and a row of horizontally aligned air holes should be employed. Each row of generally vertically aligned air holes should be arranged and constructed so that air is directed from that row of holes substantially into one of the six edges of the container defined by the intersection of the six vertical walls. Additionally, the row of horizontally aligned air holes should be arranged and constructed so that air is directed from each hole substantially into one of the six edges of the container defined by the intersection of container bottom and one of the six vertical walls.

As with the container with four vertical walls described above, the male mandrel used in the construction of a container with six vertical side walls should be conical to prevent excessive webbing or gathering of plastic at the top of the container at the edges defined by intersecting side walls. We have discovered that in order to prevent such webbing or gathering generally a conical male mandrel should be used if the container has intersecting vertical side walls. Obviously, because a container with a circular side wall does not have intersecting vertical side walls, but rather a single continuous side wall, a conical male mandrel is not required to construct such containers.

As with the container with four vertical walls and a bottom wall described above, the air holes of the male mandrel used for constructing a container with six vertical side walls should be arranged and constructed so that air is jetted from each hole into a portion of an edge defined by the intersection of two vertical side walls or the intersection of a vertical wall and bottom wall. We have discovered that generally each edge of a container formed by either the intersection of two vertical side walls or a vertical side wall and bottom should have a row of aligned air holes associated with it so that in use air is directed substantially into each such edge. If the air holes are not so arranged and constructed, we have found that the plastic is unevenly blow formed.

It was indicated above that a wide range of air pressures at the air intake of the male mandrel are contemplated in the present invention. However, of course, the air pressure in the container must be controlled so that plastic inner container is spaced from the bottom edges of the paperboard outer container defined by the intersection of the bottom of the outer container and each vertical wall of that container. Specifically, as described above, the blow forming process is controlled so that the plastic inner container is spaced from about ⅛ inch to about ⅜ inch from those bottom edges of the outer container.

One advantage of using positive pressure rather than a vacuum in the present invention, is that positive pressure can be readily controlled to cause the plastic inner container to be spaced from the bottom edges of the outer container while a vacuum can not be readily controlled to cause the drawn plastic sheet to expand from male mandrel so that the plastic is spaced from the bottom edges of the outer container. Another advantage of using positive pressure is that the air may be heated either by the male mandrel or by external means. While the use of heated air is not always required, the use of such heated air helps to maintain the plastic in a thermal formable state during the blow forming step of the present invention.

Figure 5:
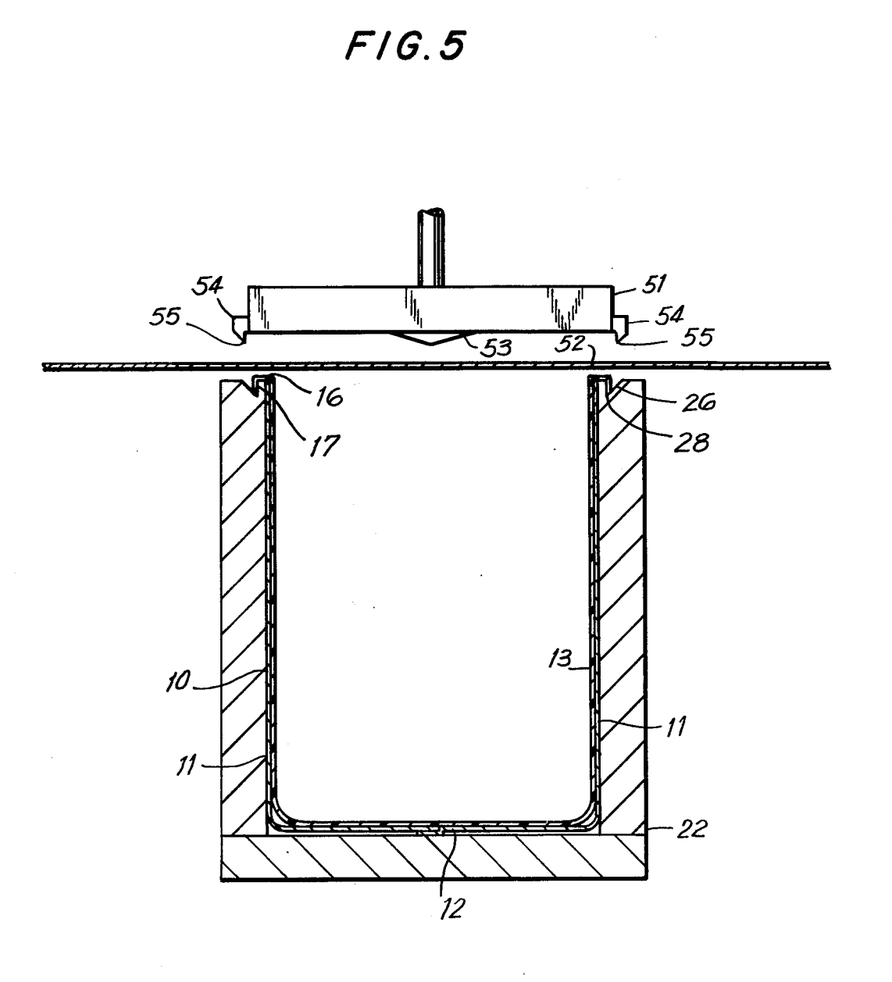
FIG. 5 shows a sectional view of the arrangement of the heated platten, heat sealable cover material, female mold and the paperboard outer container with a plastic sheet drawn and blow formed therein prior to heat sealing the heat sealable cover material onto the horizontal flanges of the container.

Referring now to FIG. 5, there is shown a sectional view of the arrangement of heated platten 51, heat sealable cover material 52, female mold 22, and paperboard outer container 10 with a plastic inner container 13 drawn and blow formed therein, just prior to heat sealing the heat seal cover onto horizontal flanges 16. Heat sealable cover material is, of course, positioned so that the above described layer of sealing material in the heat sealable cover material 52 faces the female mold. Heated patten 51 may be heated by any suitable means to a temperature so that the heat sealable cover material 52 may be heat sealed to horizontal flanges 16 by pressing said cover material onto said horizontal flanges with the heated platten 51.

Heated platten 51 is provided with air displacement block 53. During the heat sealing operation, heated platten 51 is brought into contact with heat sealable cover material 52 so that said cover material is pressed onto and heat sealed to horizontal flanges 16. As is apparent from FIG. 5, air displacement block 53 contacts the heat sealable cover material 52 before the heat sealable cover material is pressed by the platten onto horizontal flanges 16. We have discovered that by so contacting the heat sealable cover material 52, air is evacuated from the interior of the container prior to the creation of the heat seal between heat sealable cover material 52 and horizontal flanges 16. If the interior of the container of the present invention is not evacuated by suitable means, e.g. by an air displacement block, we have discovered that an adequate heat seal is not obtained.

As shown in FIG. 5, heat sealable cover material 52 is larger than required to provide a heat sealable cover for container 10. The reason for this, as will be more fully explained below, is that in the embodiment shown in FIGS. 5 and 6, a plurality of heat sealable covers are simultaneously cut and heat sealed onto a plurality of containers.

When a plurality of heat sealable covers are simultaneously cut and heat sealed, we prefer to use a single piece of heat sealable cover material 52, portions of which are used to form each heat sealable cover. As will be appreciated upon reference to FIG. 5, heated platten is provided with protruding vertical pull tab forming means 54. As shown, the protruding vertical pull tab forming means 54 has a sharp protruding edge 55. As shown in FIG. 5, heated platten 51 and female mold 22 are arranged and constructed so that when heated platten contacts heat sealable cover material 52 and presses and heat seals that material onto horizontal flange 16, is also presses and folds that material onto vertical flange 17. Additionally, the heated platten 51 and female mold are arranged and constructed so that while the heated platten presses heat sealable cover material onto horizontal and vertical flanges 16 and 17, sharp protruding edge 55 cuts heat sealable cover material 52 so as to provide a distinct heat sealable cover for each container.

In the embodiment shown in FIG. 5 there is provided heat sealable cover, including vertical pull tabs, which extend parallel to substantially the entire surface area of vertical flanges 17. However, as indicated above in connection with the description of FIG. 1, it is within the scope of the present invention to provide a heat sealable cover which does not include vertical pull tabs. As also indicated above, and as shown in FIG. 1, the heat sealable cover 18 may be precut rather than cut during the heat sealing operation. When a precut heat sealable cover is employed, that cover may be appropriately cut, as is shown in FIG. 1, preferably so that a substantial portion, e.g. at least about 80%, of the surface area of the vertical flanges 17 are covered by the vertical pull tabs.

After the containers of the present invention are provided with a heat sealable cover 18, the containers may be provided with overcap 19 by any suitable means. For example, overcap 19 may be snapped onto the container by hand.

Figure 6:
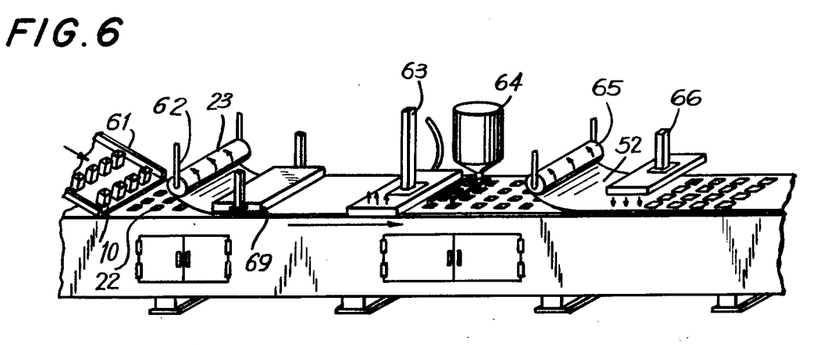
FIG. 6 is a schematic view of an apparatus for producing the container of the present invention.

Referring now to FIG. 6, there is shown a schematic view of an apparatus which may be used for producing the container of the present invention. A plurality of folded paperboard outer containers 10 may be fed to a plurality of female molds 22 by any suitable means, e.g. chute means 61 or by hand. Plastic sheet 23 is positioned with respect to male mandrel 21 and female mold 22, as described above in connection with the description of FIG. 2, by any appropriate means. As shown in FIG. 6, plastic sheet is rolled from roll means 62 into the required position. Thereafter, the plastic is drawn, blow formed, and cut as described above in connection with the description of FIGS. 2-4 at mandrel station 63. Prior to reaching mandrel station 63, plastic sheet is heated to a thermal formable state at heating station 69. Food may then be introduced into the container by any suitable means 64 or by hand.

Heat sealable cover material 52 is then positioned with respect to heated platten 51 and female mold 22 as described above in connection with FIG. 5. As shown in FIG. 6, heat sealable cover material is rolled from roll means 65 into the required position. With heat sealable material so positioned, the containers of the present invention are heat sealed at heat sealing station 66.

After the heat sealing step the containers of the present invention are removed from the female mold and preferably provided with overcap 19 by suitable means or by hand.

As shown in FIG. 6, each paperboard outer container is moved from one process station to another process station in a single female mold 22. Female mold 22 may be moved form one station to another by any appropriate means, e.g. conveyor means or the like.

It is to be understood that while the invention has been described above with respect to preferred embodiments, variations and equivalents thereof may be perceived by those skilled in the art. For example, it should be understood that the containers of the present invention do not require an overcap. Additionally, the containers of the present invention may be used to store products other than food, e.g. pharmaceuticals, cosmetics, or industrial chemicals.

The container shown in FIG. 1 has continuous paperboard vertical side walls. However, it is to be understood that the vertical side walls of the paperboard container may have cutouts so that the material stored in the containers may be viewed through a "window" in at least one vertical wall of the container.

Finally, the containers described above have heat sealable covers constructed from paperboard and sealing material and preferably paperboard, sealing material and aluminum foil. However, it is to be understood that the heat sealable covers of the present invention may be constructed from any material which may be heat sealed to the horizontal flanges of the present invention and stripped therefrom without destroying those flanges. For example, heat sealable cover may be constructed from plastic, e.g. Barex, a styrene acrylonitrile polymer.

What is claimed is:

1. An apparatus for drawing and blow forming plastic into a paperboard outer container comprising:
    (a) a female mold, said female mold comprising at least three vertical walls and a bottom wall;
    (b) a male mandrel provided with holes in communication with a source of gas whereby gas may be directed from the interior of said mandrel into said female mold, said male mandrel and female mold being arranged and constructed so that a sheet of plastic may be drawn by said male mandrel into said female mold and thereafter the sheet of drawn plastic may be blow formed in said female mold, said male mandrel and female mold being further provided with means for forming at least one horizontal flange extending from the drawn and blow formed plastic at least about $\frac{1}{8}$ inch and at least one vertical flange extending at least about $\frac{1}{8}$ inch downwardly from said at least one horizontal flange, further wherein said male mandrel is conical and is provided with at least three rows of substantially aligned holes, each row of substantially aligned holes arranged and constructed so that gas may be directed substantially into an edge of said female mold defined by the intersection of two vertical walls of said female mold.

2. The apparatus of claim 1 wherein said male mandrel and female mold include means for coacting to cut said plastic sheet after said at least one vertical flange is formed.

3. An apparatus for drawing and blow forming plastic into a paperboard outer container comprising:
    (a) a female mold, said female mold comprising at least one vertical wall and a bottom wall;

(b) a male mandrel provided with holes in communication with a source of gas whereby gas may be directed from the interior of said mandrel into said female mold, said male mandrel and female mold being arranged and constructed so that a sheet of plastic may be drawn by said male mandrel into said female mold and thereafter the sheet of drawn plastic may be blow formed in said female mold, said male mandrel and female mold being further provided with means for forming at least one horizontal flange extending from the drawn and blow formed plastic at least about ⅛ inch and at least one vertical flange extending at least about ⅛ inch downwardly from said at least one horizontal flange, further wherein said male mandrel comprises a row of substantially horizontally aligned holes arranged about the circumference of said male mandrel, said row of substantially horizontally aligned holes arranged and constructed so that gas may be directed substantially into an edge of said female mold defined by the intersection of the bottom and at least one vertical wall of the female mold.

4. The apparatus of claim 3 wherein said female mold comprises at least three vertical walls, said male mandrel is conical and is provided with at least three rows of substantially aligned holes, each row of substantially aligned holes arranged and constructed so that gas may be directed substantially into an edge of said female mold defined by the intersection of two vertical walls of said female mold.

* * * * *

UNITED STATES PATENT AND TRADEMARK OFFICE
CERTIFICATE OF CORRECTION

PATENT NO. : 4,155,697
DATED : May 22, 1979
INVENTOR(S) : Robert L. Gordon, et al.

It is certified that error appears in the above—identified patent and that said Letters Patent are hereby corrected as shown below:

Column 4, line 65, "than" should be -- then --;

Column 7, line 65, Delete "section" (second occurrence);

Column 8, line 25, "aove" should be -- above --;

Column 9, line 49, Delete "," before "above";

Column 10, line 42, "patten" should be -- platten --;

Column 11, line 14, "is" should be -- it --.

Signed and Sealed this

*Twenty-seventh* Day of *November 1979*

[SEAL]

Attest:

RUTH C. MASON
*Attesting Officer*

LUTRELLE F. PARKER
*Acting Commissioner of Patents and Trademarks*